US008326059B2

(12) United States Patent
Lee et al.

(10) Patent No.: US 8,326,059 B2
(45) Date of Patent: *Dec. 4, 2012

(54) METHOD AND APPARATUS FOR PROGRESSIVE JPEG IMAGE DECODING

(75) Inventors: Kun-Bin Lee, Hsin-Yi District (TW); Chi-Cheng Ju, Taipei (TW)

(73) Assignee: Mediatek, Inc., Hsin-Chu (TW)

( * ) Notice: Subject to any disclaimer, the term of this patent is extended or adjusted under 35 U.S.C. 154(b) by 1259 days.

This patent is subject to a terminal disclaimer.

(21) Appl. No.: 11/586,663

(22) Filed: Oct. 26, 2006

(65) Prior Publication Data
US 2007/0098275 A1  May 3, 2007

Related U.S. Application Data

(63) Continuation-in-part of application No. 10/290,302, filed on Nov. 8, 2002, now Pat. No. 7,187,802.

(30) Foreign Application Priority Data

Nov. 9, 2001 (TW) .............................. 90127965 A

(51) Int. Cl.
G06K 9/36 (2006.01)
G06K 9/46 (2006.01)
(52) U.S. Cl. ...................................................... 382/233
(58) Field of Classification Search .................. 382/233
See application file for complete search history.

(56) References Cited

U.S. PATENT DOCUMENTS

| 5,231,679 A * | 7/1993 | Matsuura et al. ............. 382/232 |
| 5,724,070 A | 3/1998 | Denninghoff et al. |
| 5,764,801 A * | 6/1998 | Munemasa et al. ........... 382/234 |
| 5,815,097 A | 9/1998 | Schwartz et al. |
| 6,111,566 A | 8/2000 | Chiba et al. |
| 6,141,453 A | 10/2000 | Banham et al. |
| 6,345,126 B1 | 2/2002 | Vishwanath et al. |
| 6,356,665 B1 | 3/2002 | Lei et al. |
| 6,377,707 B1 * | 4/2002 | Hisamatsu .................... 382/233 |
| 6,608,933 B1 | 8/2003 | Dowell et al. |
| 6,664,902 B2 | 12/2003 | Andrew et al. |
| 2001/0002937 A1 | 6/2001 | Warner et al. |

OTHER PUBLICATIONS

JPEG specification (ITU T.81 ISO/IEC 10918-1 : 1993(E).
Jaehan In et al., IEEE Transactions on Image processing, vol. 8, No. 11, Nov. 1999.

* cited by examiner

Primary Examiner — Samir Ahmed
(74) Attorney, Agent, or Firm — Birch, Stewart, Kolasch & Birch, LLP

(57) ABSTRACT

A progressively encoded image file, e.g. a JPEG bit stream, is decoded in multiple rounds. In first round, variable length encoded data in multiple scan segments of a first region are decoded. Meanwhile, position indicators for locating the next region are stored. In next round, the second region is decoded by reference to the position indicators for locating where the variable length encoded data of the second region are stored. The procedures are repeated until all regions are decoded to save memory usage during decoding.

18 Claims, 9 Drawing Sheets

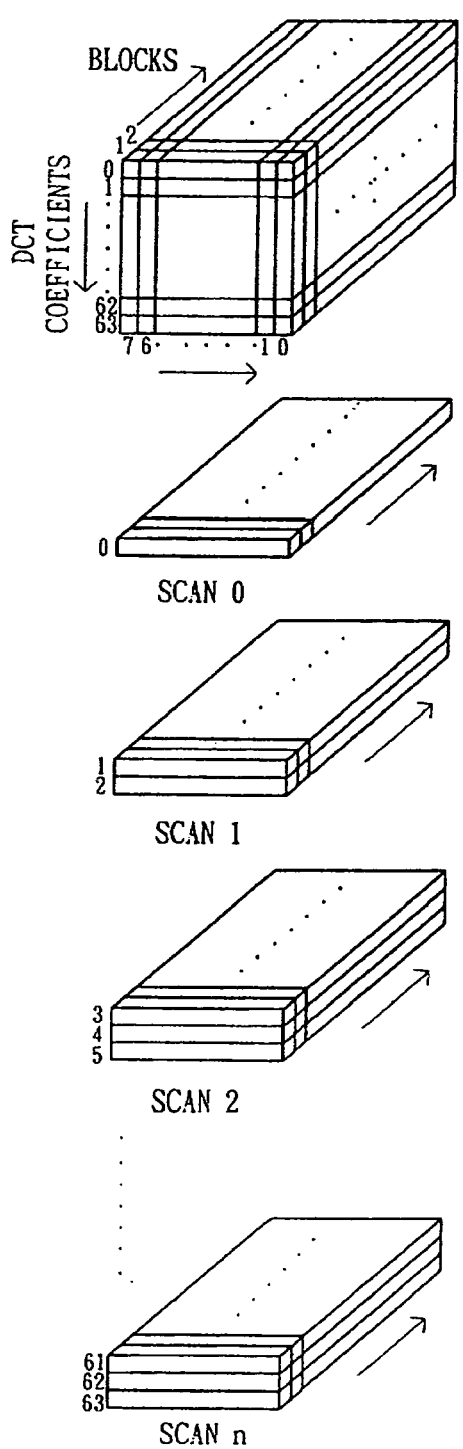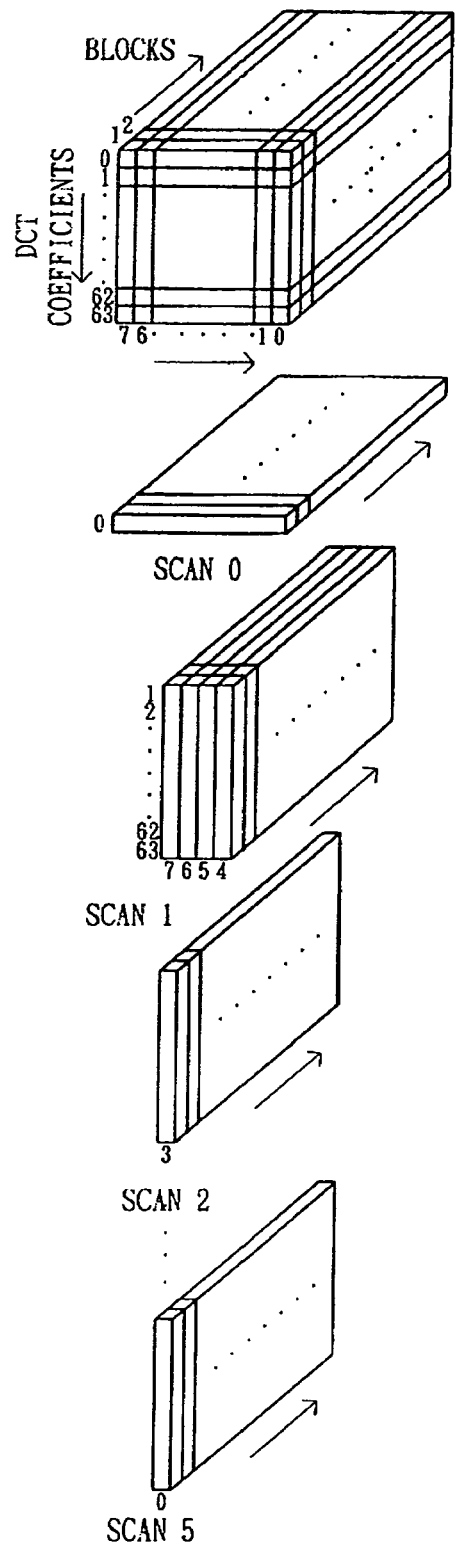
FIG. 1 (PRIOR ART)
FIG. 2 (PRIOR ART)

METHOD AND APPARATUS FOR PROGRESSIVE JPEG IMAGE DECODING

This is a continuation-in-part application of application Ser. No. 10/290,302, filed on Nov. 8, 2002 now U.S. Pat. No. 7,187,802. This application incorporates by reference Taiwan application Serial No. 090127965, filed on Nov. 9, 2001.

BACKGROUND OF THE INVENTION

1. Field of the Invention

The invention relates in general to a method and an apparatus for image decoding, and in particular to a method and apparatus for decoding progressively encoded image.

2. Description of the Related Art

JPEG is a standard for gray or color still image compression, and is widely used due to its effectiveness. JPEG provides four different modes with respective encoding and decoding methods. The four modes are sequential discrete cosine transform (DCT) based mode, progressive DCT-based mode, lossless mode, and hierarchical mode, where DCT is used for transforming signals in the time domain into signals in the frequency domain.

For the sequential DCT-based mode, uncompressed samples of an image are grouped into sample blocks of 8 by 8 pixels, and the sample blocks are processed block by block from left to right and block-row by block-row from top to bottom. When one of the sample blocks is transformed into 64 DCT coefficients by forward DCT, the 64 DCT coefficients are quantized by a quantizer and then the JPEG bit stream is produced by performing variable length encoding, for example, Huffman encoding, of the quantized DCT coefficients by a variable length encoder.

For the progressive DCT-based mode, the sample blocks of an image are also typically encoded in the same order as the sequential DCT-based mode, but in multiple scans through the image. After compression, the JPEG bit stream then includes multiple progressively encoded scan data. The encoding process is accomplished by adding an image-sized coefficient memory buffer between the quantizer and the variable length encoder. This buffer stores the coefficients of the whole image. As each sample block is transformed by performing forward DCT and then quantized, its quantized DCT coefficients are obtained and temporarily stored in this buffer. After all the sample blocks are transformed and quantized, the quantized DCT coefficients are stored in the buffer and then partially encoded in multiple scans. For each scan, the variable length encoder partially encodes the quantized DCT coefficients. The progressive DCT-based mode advantages the progressive decoding of the image when the image data is being transmitted in a limited network bandwidth environment. In such case, the decoder at the receiving end can decode the arrived scan data from the JPEG bit stream, so a rough image can be displayed at the receiving end. The image is further refined progressively when more subsequent scans are received at the receiving end. In this way, the decoding of the bit stream at the receiving end can begin without waiting for the entire bit stream to arrive, and the received image data is updated progressively.

There are two methods by which the quantized DCT coefficients in the buffer may be partially encoded within a scan. They are spectral selection and successive approximation methods. In the spectral selection method, only a specified frequency band of the coefficients of each sample block needs to be encoded in each scan. For example, the lower-frequency image data of the sample block is encoded first, and then the higher-frequency image data of the sample block is encoded. In the successive approximation method, a portion of bits of each quantized DCT coefficient is encoded each time. A specified number of most significant bits (MSB) are first encoded. In subsequent scans, a specified number of least significant bits (LSB) are encoded.

FIG. 1 illustrates the spectral selection method. In FIG. 1, each small cube represents one bit and each row of cubes represents a quantized DCT coefficient of a sample block, where the bit on the leftmost side and the bit on the rightmost side of each row are the MSB and the LSB of the corresponding quantized DCT coefficient, respectively. The 64 successive rows of cubes from top to bottom represent all 64 DCT coefficients of a sample block. In the first scan, the zeroth quantized DCT coefficients of all sample blocks, referred to as scan 0, are encoded. In the second scan, the first and second quantized DCT coefficients of all sample blocks, referred to as scan 1, are encoded. In the third scan, the third, fourth, and fifth quantized DCT coefficients of all sample blocks, referred to as scan 2, are encoded. In the subsequent scans, the remaining scans are encoded in this way. Since each quantized DCT coefficient of a sample block corresponds to a different frequency band, spectral selection method is achieved by encoding different quantized DCT coefficients of the sample blocks according to their frequency band.

FIG. 2 illustrates the successive approximation method. In the first scan, the zeroth quantized DCT coefficients of all sample blocks are encoded and referred to as scan 0. In the second scan, the fourth, fifth, sixth, and seventh bits of the quantized DCT coefficients of all sample blocks are encoded and referred to as scan 1. In the third scan, the third bits of the quantized DCT coefficients of all sample blocks are encoded and referred to as scan 2. In this way, successive approximation is achieved by encoding the corresponding bits for all sample blocks according to their significance. In addition, a different progressive sequence can be achieved by combining the spectral selection method with the successive approximation method.

After illustrating progressive JPEG encoding methods, the progressive JPEG decoding method is now discussed. In a typical progressive JPEG decoding system, an image-sized coefficient memory buffer is required to store the variable-length-decoded coefficients after variable length decoding. When collecting all the variable-length-decoded coefficients of a scan, the decoder may further perform inverse quantization and inverse DCT (IDCT) operations upon these variable-length-decoded coefficients to produce a partially reconstructed image, whereby the partially reconstructed image can first be displayed. The partially reconstructed image can later be refined progressively when the variable-length-decoded coefficients of other scans are also ready and processed by the IDCT operations. However, the main drawback of the typical progressive JPEG decoding system is the requirement of an image-sized coefficient memory buffer. Since the image to be reconstructed may have a huge size, the buffer size will become very large. For example, an image may have a maximum size of 65,535 by 65,535 pixels as specified in JPEG T.81 specification. Since an ordinary JPEG decoding system does not have such a large buffer, the decoding of the image would fail. Furthermore, information appliance (IA) products are widely used nowadays, and are generally equipped with a much smaller memory. For these IA products, decoding of a large-sized progressive JPEG compressed image becomes impossible. Hence, in view of the above-mentioned problems, it is desirable to develop a progressive JPEG decoding apparatus and method, which can decode progressive JPEG compressed images even under an environment with limited memory resources.

SUMMARY OF THE INVENTION

According to a preferred embodiment, a progressively encoded image file is decoded in multiple rounds. In each round, only a region is decoded by accessing its variable length encoded data in multiple scan segments. A scan marker is used to locating each scan segment. In addition, a position indicator is stored for indicating beginning of variable length encoded data of next region in each scan segment. By using the position indicators and the scan markers, a progressively encoded image can be decoded region by region, so as to function normally in applications with very limited memory.

It is therefore an object of the invention to provide an apparatus for progressive JPEG decoding and a method thereof so that progressive JPEG decoding can be performed with a limited memory resource.

The invention achieves the above-identified object by providing an apparatus for JPEG decoding upon receiving a JPEG bit stream so as to output image data indicative of the image. The apparatus includes a memory, a memory management unit, and a processing unit. The memory management unit is coupled to the memory, and is used for controlling the memory access. The processing unit is coupled to the memory and the memory management unit, and is used for receiving the JPEG bit stream and outputting the image data by executing a method for JPEG decoding. The method includes the following steps. First, data indicative of a scan of the JPEG bit stream are received. Second, the data indicative of the scan are divided into a plurality of regions. One of the regions is then selected as a current decoding region. Next, after the data indicative of the scan are decoded, decoded coefficients of the current decoding region are produced according to the data indicative of the decoding region; a nonzero history of the decoded coefficients of the current remaining regions and the beginning addresses of the current remaining regions are produced according to the data indicative of the remaining regions of the scan. The current remaining regions are the regions of the scan except the current decoding region of the current scan. The decoded coefficients of the current decoding region, the nonzero history of the decoded coefficients of the current remaining regions, and the beginning addresses of the current remaining regions are stored in the memory. The above steps repeat until all scans are decoded. Finally, the decoded coefficients of the current decoding region of all scans are outputted in order to construct a portion of the image data.

The principle of the invention is to divide a progressive JPEG image into different regions and then decode the regions individually, wherein the buffer size required for decoding each region is reduced. In this way, even with a limited memory resource, the progressive JPEG decoding of the regions can be performed. Certainly, the invention is capable of decoding the whole image at one time when the system memory is large enough for decoding the whole image.

Other objects, features, and advantages of the invention will become apparent from the following detailed description of the preferred but non-limiting embodiments. The following description is made with reference to the accompanying drawings.

BRIEF DESCRIPTION OF THE DRAWINGS

FIG. 1 illustrates a spectral selection method.
FIG. 2 illustrates a successive approximation method.

DETAILED DESCRIPTION OF THE INVENTION

Figure 3:
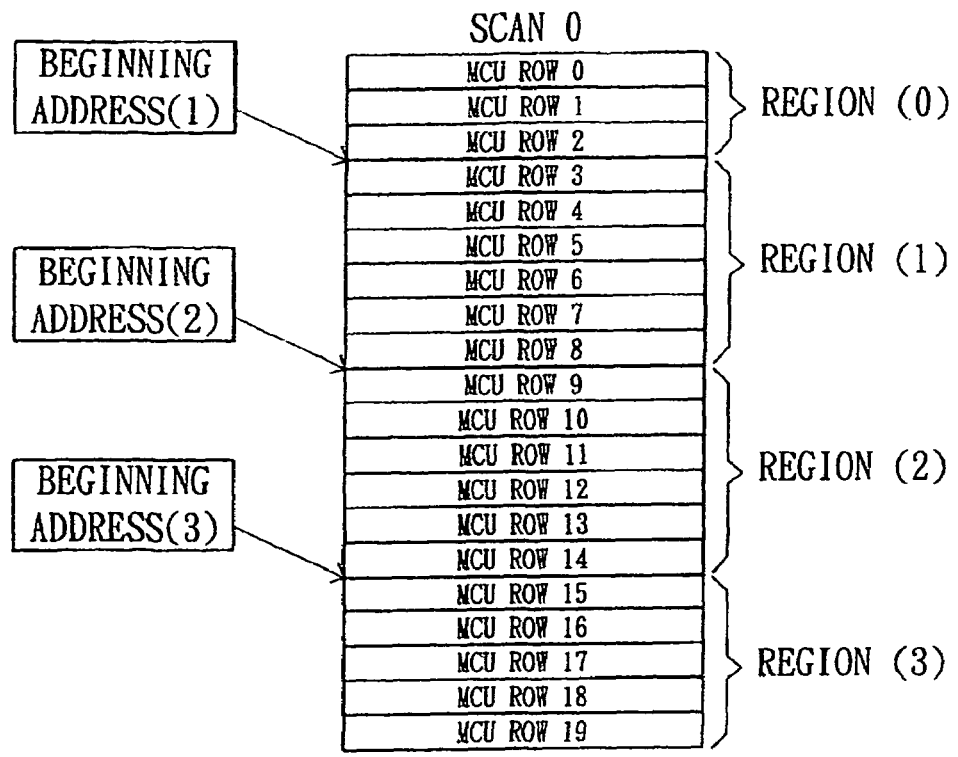
FIG. 3 illustrates region configuration for scans according a preferred embodiment of the invention.
Figure 3:
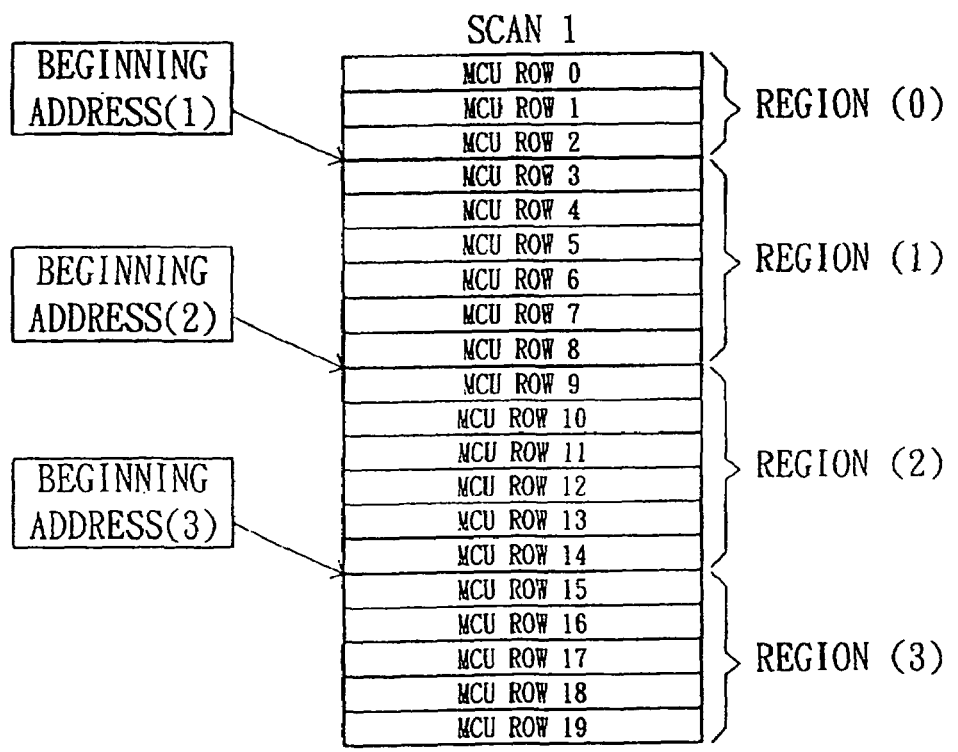

According to one preferred embodiment of the invention, each scan of the progressive JPEG image is divided into a number of regions. Each region may comprise one or more minimum coded unit (MCU) rows. The number of the regions for each scan is determined according to the size of the memory. For each decoding, one of all the regions in a scan is selected as a current decoding region while the other regions in the same scan are defined as the current remaining regions. After the current decoding region of the current scan and the current decoding regions corresponding to all other scans have been decoded, another region is selected as a subsequent decoding region. Then the subsequent decoding region of the current scan, and the subsequent decoding regions corresponding to all other scans are decoded. The decoding of the scans is performed region by region in this way until all regions of all scans are decoded. When decoding a current decoding region of a current scan, the decoder also decodes the same decoding region corresponding to the next scans. The decoder needs to read data of the beginning address of the current decoding region corresponding to the next scan in the JPEG bit stream. Since the JPEG bit stream is produced by variable length encoding, variable length decoding of the regions between the decoding regions in the current and subsequent scans must be performed to determine the beginning address of the decoding region of the next scan in the JPEG bit stream. Furthermore, the decoding process of scans in a progressive JPEG bit stream is dependent. That is, in order to decode the current decoding regions of the current scan, the decoder has to refer to the decoded data of the current decoding regions corresponding to previous scans. Therefore, the decoded coefficients obtained when decoding previous scans need to be stored in the memory so as to be used when decoding the next scan. Because of the limited memory resource, an image-sized buffer may be unavailable for storing all the decoded coefficients in the previous scans. After carefully investigating the G.1.2.3 section of international telecommunication union (ITU) T.81 JPEG specification, the inventor of the present invention finds that during Huffman variable length decoding of a coefficient in a current scan, only the nonzero history of the decoded coefficients of the same decoding region corresponding to the previous decoded scans is needed. The nonzero history is the information of whether or not the decoded coefficient of the same decoding region corresponding to each of the previous scans is a non-zero value. Thus, the preferred embodiment according to the present invention stores only the nonzero history of every decoded coefficient of the current remaining regions, rather than storing all decoded coefficients, for Huffman variable length decoding process. In addition, the nonzero history of each coefficient needs to be stored using only one bit, indicating whether or not the co-sited decoded coefficient of the same decoding region corresponding to each of the previous scans is a non-zero value. Therefore, the memory space for storing the nonzero history of the coefficients is very small so the memory resource required for use in decoding can be reduced significantly and dramatically.

FIG. 3 illustrates region configuration for a scan according a preferred embodiment of the invention. In this example, assume the image contains two scans: scan (0) and scan (1). Scan (0) and scan (1) have their respective regions (0), regions (1), regions (2), and regions (3). Each region (0) has three MCU rows. Each region (1) has six MCU rows. Each region (2) has six MCU rows. Each region (3) has only five MCU rows because there are totally 20 MCU rows and no more MCU rows left.

Figure 4:
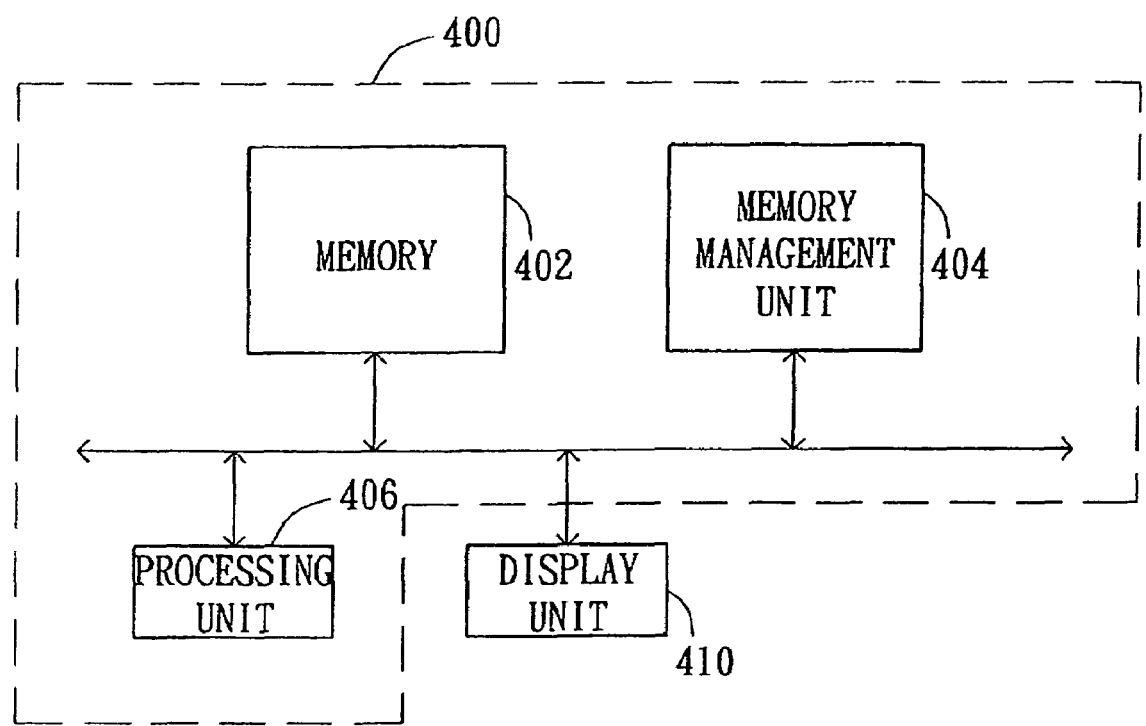
FIG. 4 is a block diagram illustrating a progressive JPEG decoding system according to the preferred embodiment of the invention.

FIG. 4 shows a block diagram illustrating a progressive JPEG decoder according to a preferred embodiment of the invention. A decoding device 400 includes a memory 402, a memory management unit 404, and a processing unit 406. The processing unit 406 is used for fetching a JPEG bit stream stored in the memory 402 with the aid of the memory management unit 404, producing the decoded coefficients by decoding the JPEG bit stream, and outputting the decoded coefficients, which are stored back into the memory 402. The display unit 410 fetches the decoded coefficients from the memory 402 with the aid of the memory management unit 404 for displaying the image corresponding to the JPEG bit stream on the display unit, such as a monitor. The processing unit 406 can be, for example, a digital signal processor (DSP) and is used for executing a progressive JPEG decoding method according to the invention. The memory management unit 404 is used to control access to the memory 402.

Figure 5:
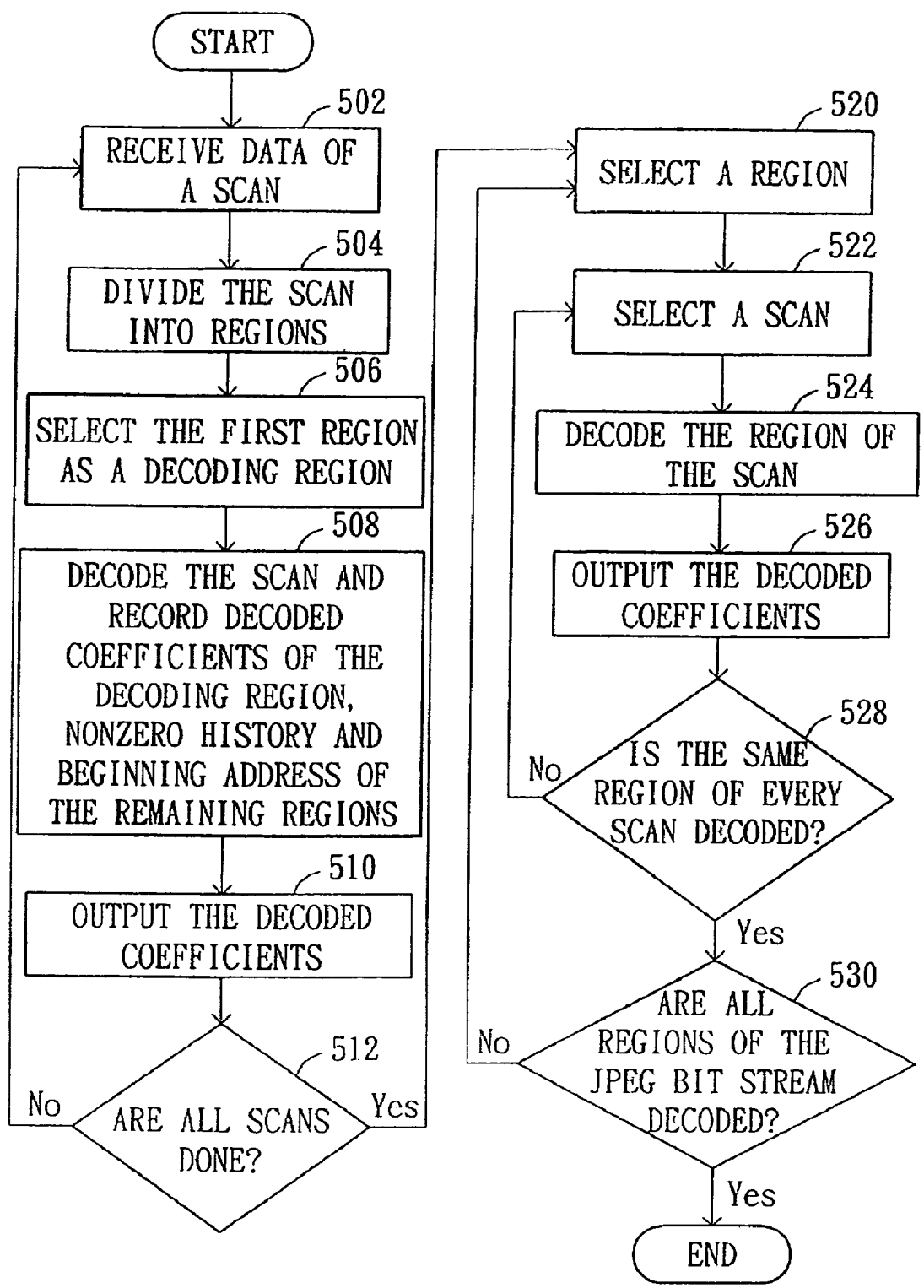
FIG. 5 is a flowchart illustrating a progressive JPEG decoding method according to the preferred embodiment of the invention.

FIG. 5 illustrates a progressive JPEG decoding method according to the preferred embodiment of the invention. The progressive JPEG decoding method includes a first decoding procedure and a second decoding procedure. The memory includes a coefficient buffer, a nonzero history buffer, and a beginning address buffer. The coefficient buffer is used for storing the decoded coefficients produced by performing variable length decoding of the current decoding region. The nonzero history buffer is used for storing the nonzero history of the decoded coefficients of the current remaining regions, wherein the current remaining regions are the regions of the current scan except the current decoding region. The beginning address buffer is used for storing the beginning address of the received JPEG bit stream for the current remaining regions of each scan. The first decoding procedure includes the following steps. First, the data of a scan of a JPEG bit stream are received, as shown in step 502. In step 504, the scan is divided into a plurality of regions, such as a first region, a second region, a third region, . . . etc, and each region contains one or more MCU rows. The sizes of the first regions of all corresponding scans are identical; the sizes of the second regions of all corresponding scans are identical, and so on. Next, the first region is selected, and defined as a current decoding region, as shown in step 506. In step 508, the current scan is decoded, and all the decoded coefficients of the current decoding region (the first region in this example), the nonzero history of the decoded coefficients of the current remaining regions (the second region, the third region, . . . etc. in this example), and the beginning addresses of the current remaining regions are obtained. The current remaining regions described above are the regions of the current scan except the current decoding region of the same scan. The decoded coefficients of the current decoding region, the nonzero history of the current remaining regions, and the beginning addresses of the current remaining regions are stored into the coefficient buffer, the nonzero history buffer, and beginning address buffer of the memory, respectively. Because only the decoded coefficients of the current decoding region, the nonzero history of the current remaining regions, and the beginning addresses of the current remaining regions are stored, the amount of memory required for decoding can be substantially reduced. The decoded coefficients of the current decoding region are then outputted to a memory as shown in step 510. Next, in step 512, it is determined whether the current decoding region of all corresponding scans of the JPEG bit stream have been processed by the first decoding procedure. If so, the decoded coefficients of the current decoding region of all corresponding scans are outputted to later stages for de-quantization and IDCT, and the second decoding procedure is performed in the current Huffman variable length decoding stage; otherwise, proceeds to the step 502 and the decoding of the current decoding region corresponding to the next scan begins.

In the second decoding procedure, a region other than the decoding region in the first decoding procedure, such as the second region is selected as the new current decoding region in step 520. A scan is then selected as a current scan in step 522. The scan selection in step 522 will be sequentially performed from scan 0 to the last scan in the JPEG bit stream. Next, step 524 is executed to access the memory for retrieving the beginning address of the current decoding region of the current scan and decode the current decoding region of the current scan. The beginning address of the current decoding region is fetched directly from beginning address buffer obtained and stored during the first decoding procedure. After that, the decoded coefficients of the current decoding region are outputted to the memory, as indicated in step 526. A determination is then made as to whether or not the current decoding region of every scan has been decoded, as shown in step 528. If so, the decoded coefficients of the current decoding region of all corresponding scans are outputted to later stages for de-quantization and IDCT, and the method proceeds to step 530; otherwise, the method proceeds to step 522. In step 530, it is determined whether all regions of the JPEG bit stream have been decoded. If so, the method ends; otherwise, the method proceeds to step 520 for decoding other regions (for example, the third region, the fourth region, . . . etc.) of all the scans.

As described above, the first decoding procedure is to decode all scans, but only to store the decoded coefficients of the current decoding region (ex. the first region) corresponding to all scans, the nonzero history of the remaining regions (ex. the second region, the third region, . . . etc.) corresponding to all scans, and the beginning addresses of the decode coefficients of the remaining regions corresponding to all scans. In the second decoding procedure, the remaining regions (ex. the second region, the third region, . . . etc.) of all scans are decoded referring to the nonzero history and the beginning addresses obtained during the first decoding procedure, and the decoded coefficients of all remaining regions of all scans are obtained. Since the nonzero history and the beginning addresses of the remaining regions corresponding to all scans are obtained and stored into the memory during the first decoding procedure, the remaining regions are not required to be re-decoded. In addition, the nonzero history buffer used in the first decoding procedure can be reclaimed and the reclaimed memory can be reallocated to the coefficient buffer, allowing the coefficient buffer to provide more memory capacity needed for the decoding of the new current decoding regions in the second decoding procedure. Therefore, the size of the regions decoded in the second decoding procedure could be larger and contains more MCU rows. In the illustrated embodiment, the first region contains three MCU rows, and the other regions can contain as much as six MCU rows. In this example the third region contains only five MCU rows because there are totally twenty MCU rows and no more MCU rows left un-assigned. In this way, the progressive JPEG decoding method and apparatus disclosed above can be performed effectively in the case of having a limited memory resource.

Further Embodiment

Figure 6:
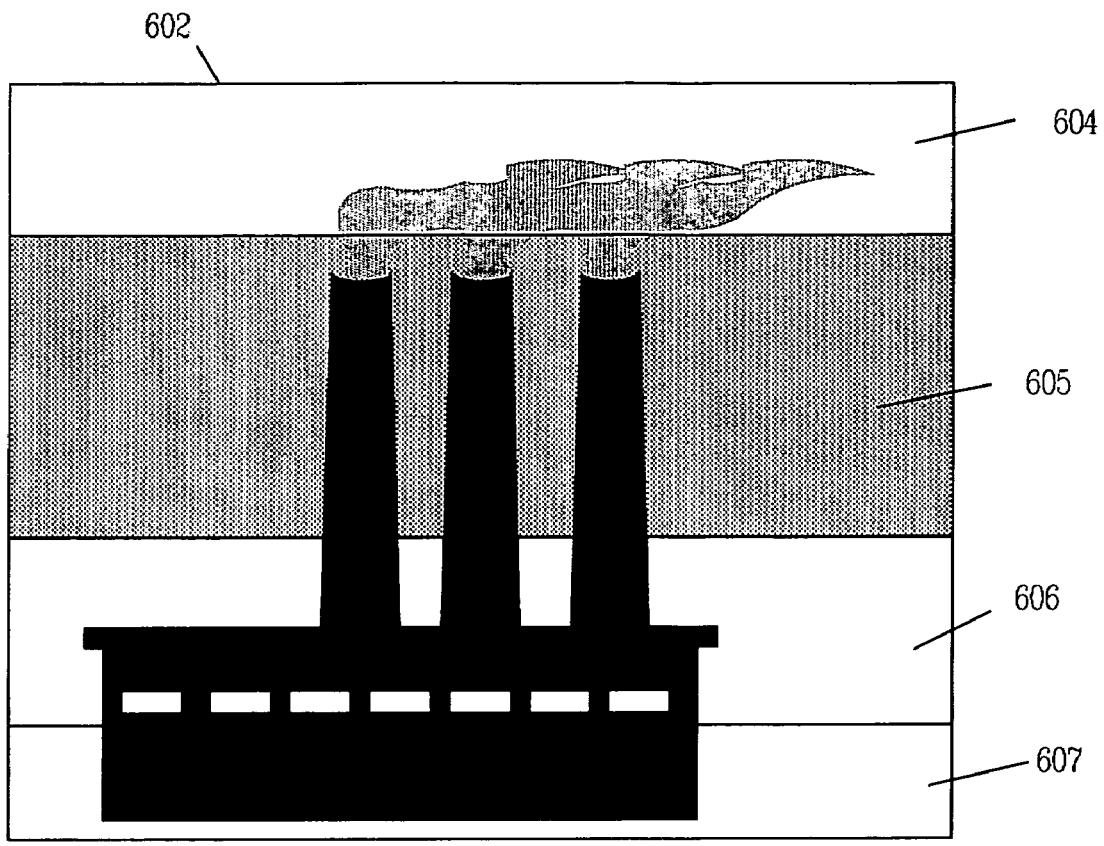
FIG. 6 is an example of JPEG image.

FIG. 6 illustrates an example of dividing an image 602 into four regions 604, 605, 606 and 607. First, the division can be done logically in a decoder according to memory limitation or other design requirements of the decoder. Moreover, each region does not have to be of the same size. Second, in the example, the image is encoded in progressive JPEG standard and stored as an image file. The term "file" here refers to include any stream format or static electronic file format or other electronic format for recording information. The "progressive JPEG standard" here refers to an encoding approach that the image is encoded in multiple scans so that when decoding, a rough resolution image is displayed first when a portion scans are decoded and a more detailed image is displayed later when information of more scans is obtained. A detail example of progressive encoding is illustrated and incorporated here as a reference in the "Information Technology—Digital Compression and Coding of Continuous-Tone Still Images-Requirements and Guidelines, Recommendation T.81", published by CCITT in September 1992. In the T.81 document, Annex G particularly describes how a progressive encoding is performed with multiple scans. The following example is based on the JPEG standard as illustrated in T.81. In addition to the JPEG format, the inventive approach can also be applied in any progressively encoded image format that arranges variable length encoded data into multiple scans.

Figure 7:
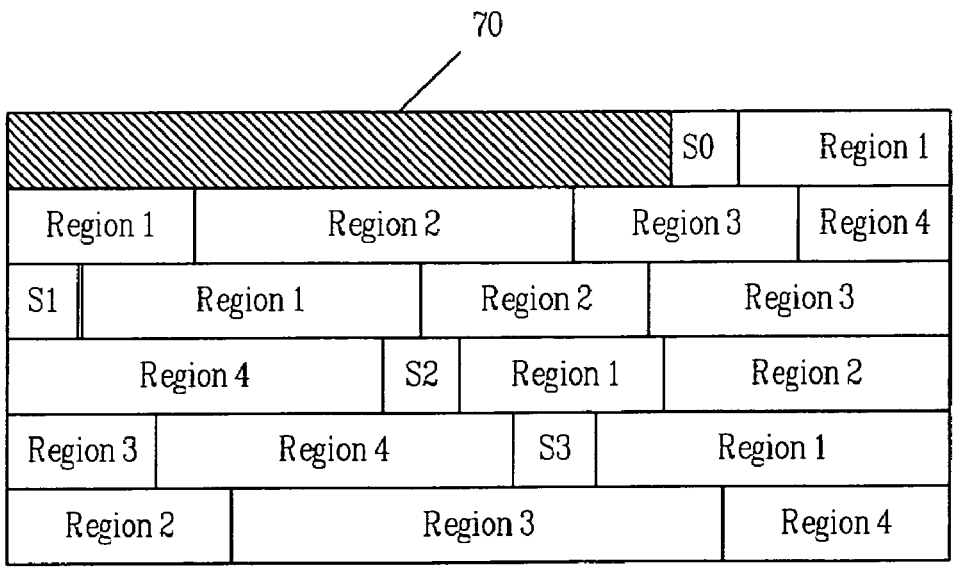
FIG. 7 is a diagram illustrating how the image of FIG. 6 is stored as a file.
Figure 8:
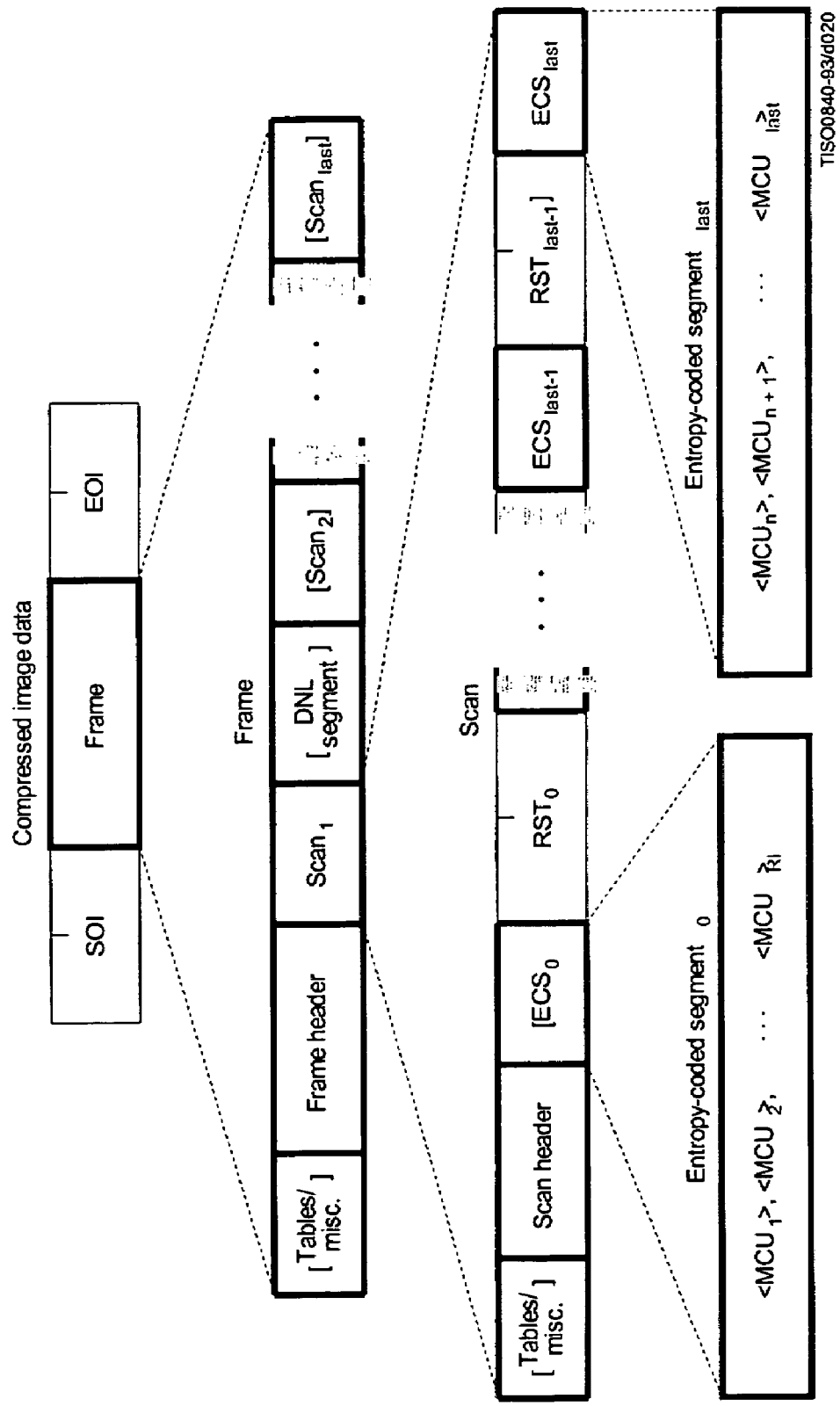
FIG. 8 illustrates hierarchy syntax structure of a JPEG file.
Figure 9:
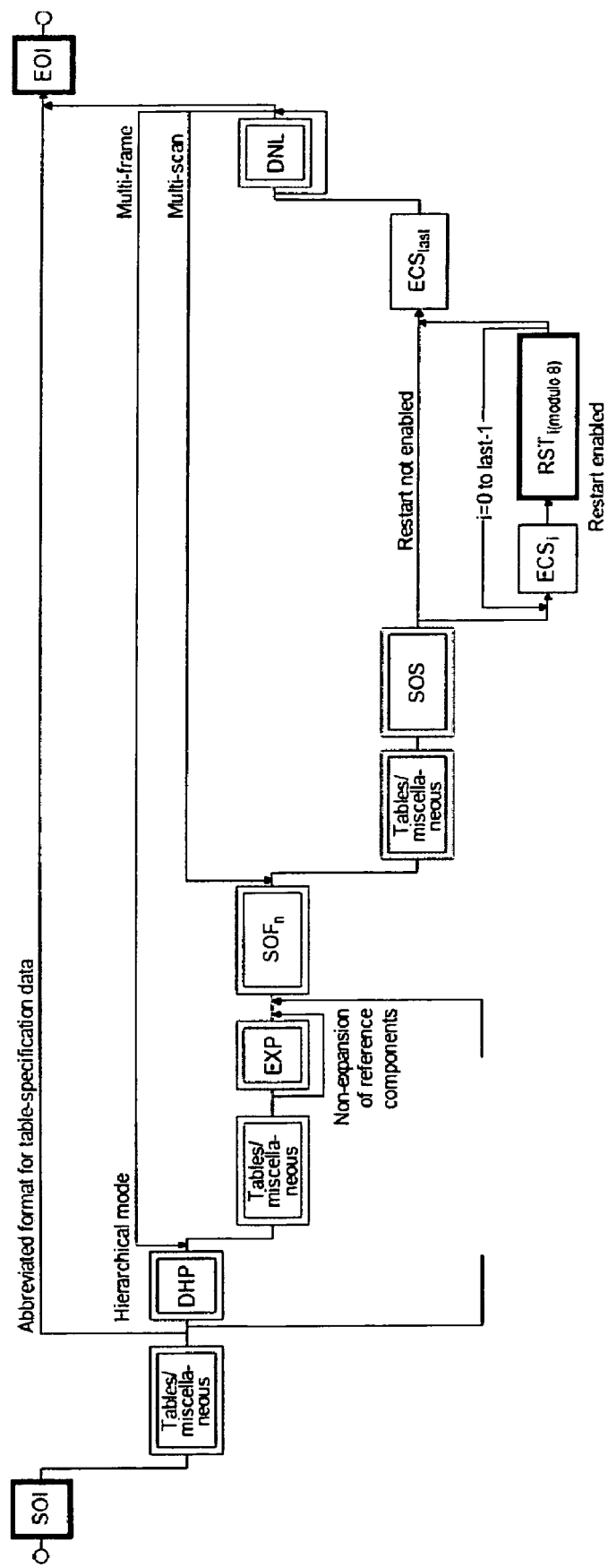
FIG. 9 illustrates flow of compressed data syntax.

FIG. 7 illustrates a schematic diagram of arranging multiple scan segments into an image file 70 under progressive JPEG encoding. The image file 70 contains multiple scan segments, e.g. four scan segments. Each scan segment contains a scan header and variable length encoded data. The four scan segments are arranged successively and each scan header contains one or more marker segments, i.e., S0, S1, S2 and S3. Each marker segment contains one or more scan marker, which can be parsed to locate a position of a scan segment. For example, in JPEG standard, each marker segment begins with X'FF and a non-zero one byte 'marker code' to identify its function. In addition to this two-byte marker, some scan markers are followed by particular sequences of parameters, as in the case of table specifications, frame header, or scan header. Other scan markers are used without parameters for functions such as marking the start-of-image and end-of-image. A list of marker segment for JPEG standard can be found at Table B.1 of the T.81 document that is mentioned above. In addition, FIG. 8 illustrates a structure of a standard progressive JPEG encoding file or stream. As illustrated in FIG. 8, a progressive JPEG file or stream contains one ore more frames. Each frame contains multiple scan segments, e.g. $Scan_1$, $Scan_2$ to $Scan_{last}$. Each scan segment further contains a scan header and an associated entropy-coded segment, i.e. the variable length encoded data as mentioned above. Each entropy-coded segment further contains a plurality of MCU blocks. In addition, FIG. 9 illustrates the syntax definition of FIG. 8. SOI is followed by a Tables/miscellaneous marker segment, which is followed by one of EOI, DHP or SOFn segment. DHP is followed by a multi-frames loop. Each frame loop contains Tables/miscellaneous, EXP, $SOF_n$ and multiple scan data. For each scan, Tables/miscellaneous is followed by SOS (Start-of-Scan) marker segment and one or more ECSs. More detailed information can be found at the incorporated document T.81. Form the above description, it is known that a progressive encoded file, e.g. a progressive JPEG encoded file, contains a scan marker, e.g. SOS, before each scan and the scan marker and related scan header parameters are followed by variable length encoded data which length is determined by image information contained therein instead of pixel numbers. In JPEG standard, the variable length encoded data are encoded using Huffman encoding or Arithmetic coding.

Therefore, when an image is logically divided into multiple regions for decoding under certain requirements, e.g. memory capacity limitation, a beginning address for each region in a scan segment is not available unless its previous regions are decoded. In the following, an embodiment of decoding procedure is illustrated for explaining how to decode a progressively encoded image file with limited memory.

Figure 10:
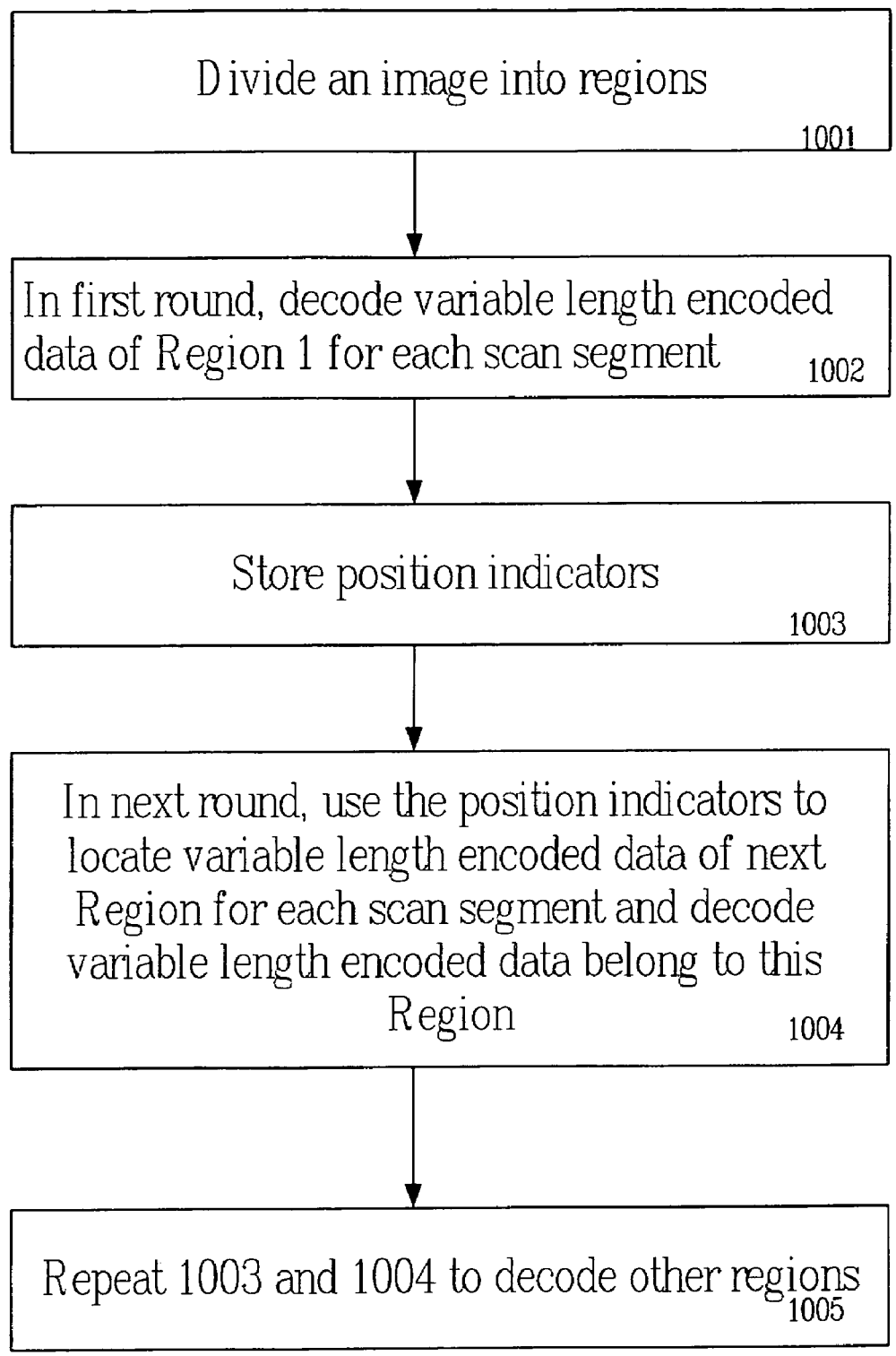
FIG. 10 illustrates an embodiment for decoding JPEG and other progressively encoded files.

In FIG. 10, when receiving sufficient information from an image file that is progressively encoded, the image is logically divided into multiple regions (step 1001), e.g. the four regions as illustrated in FIG. 6. For example, when picture dimension width and length are available, the division number of the image is determined by considering memory capacity. The multiple regions are decoded successively. That is, there are multiple rounds for decoding the complete image. In first round, only the first region of scan segments is decoded to obtain an decoded image portion while ignoring other regions during decoding the first region (step 1002). It is noted here that due to resolution of display or other considerations, it is not necessary to decode every scan segment to finish the decoding. For example, if there are totally 7 scans, 4 scans may be sufficient for some applications. Thus, decoding the first region does not need to finish all scans stored in the image file. Meanwhile, when decoding the first region for multiple scans, multiple position indicators are stored (step 1003) for indicating the end of the variable length encoded data of the first region or the beginning of the variable length encoded data of the second region or any variable that can be used for locating the beginning of the variable length encoded data of the second region. In next round, use the position indicators to locate variable length encoded data of next Region for each scan segment and decode variable length encoded data belong to this Region (step 1004). For example, the second region for multiple scans is decoded by reference to the position indicators for indicating where the variable length encoded data are placed in the image file. When decoding the second region for multiple scan segments, position indicators for indicating where the variable length encoded data of the third regions are stored for later decoding the third region. All the regions are successively decoded one after another until all regions are decoded (step 1005).

To locate scan segments by skipping other regions during decoding under procedures illustrated above, scan markers are used. It is known that in progressive JPEG format, scan marker like SOS (start-of scan) is available at the beginning of each scan segment and can be parsed to locate scan segments. It is noted that other scan markers, in addition to SOS, can be used if they can be used for locating scan segments. For example, Define Huffman table marker and Define number of lines marker in JPEG standard can be used as scan markers as mentioned here.

Alternatively, a scan segment can also be located by storing its starting address after the first region is decoded. This is because when the first region is decoded, multiple scan segments are accessed. If a scan marker indicator that indicates beginning of each scan segment is stored, a decoder does not have to parse the scan marker each time but use the scan marker indicators to locate each scan segment in the second or next rounds.

In addition, since there are multiple rounds in the decoding and the scan headers are decoded for multiple times, a better solution is to store a portion of decoded results, e.g. Huffman table information and quantization table information. Under such implementation, the same scan parameters are only decoded once.

Figures 11, 12:
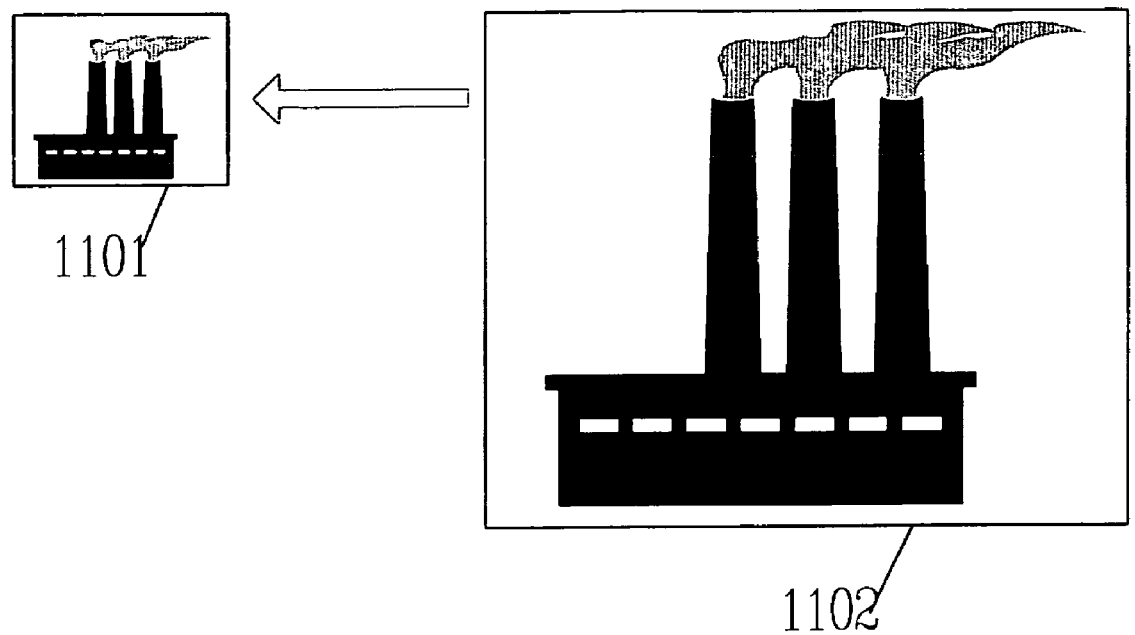
FIG. 11 illustrates image scaling.
FIG. 12 illustrates non-zero histories and associated coefficients.

For applications like mobile phones or DVD players that are equipped with or using a low resolution display to show images, an image is usually scaled down before showing on the display. As illustrated in FIG. 11, an image 1102 with 1024×768 pixel resolution is scaled to an image 1101 of 320×200 pixel resolution before sending to a display. For more effectively utilizing memory or using less memory, the decoded coefficients decoded from the variable length encoded data in progressively encoded image file can be scaled. Therefore, a smaller buffer size is sufficient since multiple pixel information is stored as fewer pixels during scaling. Under the progressively encoded format, however, non-zero information needs to be stored for successively decode the image file. A better solution is that storing the non-zero information using one bit for each pixel or decoded coefficient. FIG. 12 illustrates storing non-zero information of a matrix of 12 pixels into 0 or 1, costing only one bit for each pixel or decoded coefficient. A non-zero history with a size smaller than that the associated coefficient is stored for decoding requirement. After non-zero histories are stored, the 12 pixels can then be scaled into 2 pixels and only 2 pixels are stored instead of storing the 12 pixels.

It is noted that the above method illustrated in FIG. 10 is very suitable to be used in the decoding device as illustrated in FIG. 4 that contains a limited memory. The decoding device 400 contains a decoder unit, which can be implemented using a processor running instructions or equivalent hardware logic hardware for performing the steps illustrated in FIG. 10 to decode a progressively encoded image file. Other types of designs for implementing the decoding device 400 are possible, e.g. implementing the processor using specific hardware logic circuits. It is also noted that the decoder device 400 may have multiple memory devices. For example, there can be an internal SRAM embedded in an integrated chip that contains a processor. In addition, there can be a DRAM accessible by the integrated chip. During decoding, the SRAM can be used as a buffer for storing temporary calculation results, e.g. non-zero histories. Meanwhile, the decoded coefficients and/or the decoded image pixels are stored in another memory, e.g. the DRAM. It depends on hardware design requirement to arrange memory space and devices and to determine which memory device and addresses for storing necessary information.

Also, it is noted that storing non-zero history with smaller size than that of decoded coefficient is very useful for decoding JPEG or similar image formats. In the first embodiment as mention above, the non-zero history information is used for locating variable length encoded data of each region. In the other embodiment that uses scan markers and position indicators for locating the variable length encoded data of each region to be decoded, it is also useful to store the non-zero history information in certain applications, e.g. to store scaled results instead of decoded coefficients in memory devices to decrease memory requirement. Thus, storing a non-zero history with a smaller size, e.g. 1 bit, than its associated decoded coefficient is helpful for designing an application in an environment when memory limitation is a critical issue. Under certain consideration, it is not necessary to store a non-zero history for every decoded coefficient if some decoded coefficients are stored with their original data. Even storing only a subset of the decoded coefficients with their corresponding non-zero histories can save certain amount of memory usage.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for decoding an image file storing an image being progressively encoded in a decoder with a memory with limited capacity, comprising:
   dividing the image into a plurality of regions, each of the regions indicating a different portion of the image and corresponding to a portion of variable length encoded data of multiple scan segments of the image file;
   in a first round, decoding variable length encoded data of at least some of the multiple scan segments of the image file for a first region of the regions to obtain a corresponding portion of the image while ignoring other regions;
   storing multiple position indicators of variable length encoded data of a second region of the regions for the multiple scan segments of the image file in the memory while decoding the first region; and
   in a second round, decoding variable length encoded data of at least some of the multiple scan segments of the image file for the second region by reference to the multiple position indicators instead of again decoding variable encoded data of the first region in the multiple scan segments of the image file;
   wherein the regions are decoded successively in multiple rounds including the first round and second round until all of the regions are decoded accordingly.

2. The method of claim 1, wherein the image file is encoded under progressive JPEG standard.

3. The method of claim 2, furthering comprising: identifying a scan marker indicating each scan segment of the image file so as to trace to a beginning address of the first region in each scan segment of the image file.

4. The method of claim 3, further comprising: storing at least one decoded scan parameter while decoding the first region so that the at least one decoded scan parameter is used when decoding the second region.

5. The method of claim 4, wherein the scan parameter is selected from at least one of scan header information, Huffman table information and quantization table information.

6. The method of claim 3, wherein the scan marker is selected from at least one of start-of-scan marker, Define Huffman table marker and Define number of lines marker.

7. The method of claim 3, further comprising: storing a scan marker address indicating position of the scan marker for each scan segment when decoding the first region so that the scan marker addresses are used for identifying the scan markers when decoding the second region.

8. The method of claim 1, further comprising:
storing scaled decoded coefficients of the variable length encoded data of the first region for one scan segment; and
storing a non-zero history for each decoded coefficient in at least a subset of the decoded coefficients for indicating whether one decoded coefficient is zero or nonzero so as to be used when decoding the variable encoded data of the first region for another scan segment next to said one scan segment, wherein the size of the non-zero history is smaller than the size of associated decoded coefficient.

9. An electronic device for decoding an image file storing an image being progressively encoded, comprising:
a memory device with limited capacity as a temporary buffer;
a decoder unit using the temporary buffer for performing decoding of the image file, wherein the image is divided into a plurality of regions, each of the regions indicates a different portion of the image and corresponds to a portion of variable length encoded data of multiple scan segments of the image file, the decoder decodes the regions successively in multiple rounds including a first round and a second round until all of the regions are decoded accordingly;
wherein in the first round, the decoder decodes variable length encoded data of at least some of the multiple scan segments of the image file for a first region of the regions to obtain a corresponding portion of the image while ignoring other regions;
the decoder stores multiple position indicators of variable length encoded data of a second region of the regions for multiple scan segments of the image file while decoding the first region; and
in the second round, the decoder stores variable length encoded data of at least some of the multiple scan segments of the image file for the second region by reference to the multiple position indicators instead of again decoding variable encoded data of the first region.

10. The device of claim 9, wherein the image file is encoded under progressive JPEG standard.

11. The device of claim 10, wherein the decoder is further for identifying a scan marker indicating each scan segment of the image file so as to trace to a beginning address of the first region in each scan segment of the image file.

12. The device of claim 11, wherein the decoder is further for storing at least one decoded scan parameter while decoding the first region so that the at least one decoded scan parameter is used when decoding the second region.

13. The device of claim 12, wherein the scan parameter is selected from at least one of scan header information, Huffman table information and quantization table information.

14. The device of claim 11, wherein the scan marker is selected from at least one of start-of-scan marker, Define Huffman table marker and Define number of lines marker.

15. The device of claim 10, wherein the decoder is further for storing a scan marker address indicating position of the scan marker for each scan segment when decoding the first region so that the scan marker addresses are used for identifying the scan markers when decoding the second region.

16. The device of claim 9, wherein the decoder is further for:
storing scaled decoded coefficients of the variable length encoded data of the first region for one scan segment; and
storing a non-zero history for each decoded coefficient of at least a subset of the decoded coefficients for indicating whether one decoded coefficient is zero or nonzero so as to be used when decoding the variable encoded data of the first region for another scan segment next to said one scan segment, wherein the size of the non-zero history is smaller than the size of associated decoded coefficient.

17. A method for decoding a progressive joint photographic expert group (JPEG) bit stream in an electronic apparatus with a memory device having limited capacity, comprising:
receiving the JPEG bit stream; parsing the JPEG bit stream to obtain scan data to be decoded;
decoding the scan data containing variable length encoded data to obtain associated decoded coefficients; storing non-zero histories associated to at least a subset of decoded coefficients in the memory device, wherein one non-zero history indicates whether one associated decoded coefficient is zero and the size of said one non-zero history is smaller than the size of said associated decoded coefficient; and
decoding the JPEG bit stream according to the non-zero histories stored in the memory device.

18. A method for decoding an image in a decoder with limited memory capacity, comprising:
decoding a first region of the image while ignoring other regions of the image for multiple scan segments; and
decoding a second region of the image for the multiple scan segments after the first region of the image for multiple scan segments is completed;
wherein position indicators of the second region are stored in a memory of the decoder for decoding the first region of the image for the multiple scan segments, and wherein the image is divided into a plurality of regions, each of the regions indicates a different portion of the image and corresponds to a portion of encoded data of the multiple scan segments of the image file, and the regions including the first and second regions are decoded successively in multiple rounds including the first round and second round until all of the regions are decoded accordingly.

* * * * *